United States Patent
Bordeaux et al.

(10) Patent No.: US 6,364,397 B1
(45) Date of Patent: Apr. 2, 2002

(54) ATTACHMENT DEVICES FOR ATTACHING A WINDOW FOR A MOTOR VEHICLE

(75) Inventors: Frederic Bordeaux, Bourg la Reine (FR); Volkmar Offermann, Herzogenrath (DE)

(73) Assignee: Saint-Gobain Glass France, Courbevoie (FR)

( * ) Notice: Subject to any disclaimer, the term of this patent is extended or adjusted under 35 U.S.C. 154(b) by 0 days.

(21) Appl. No.: 09/507,944

(22) Filed: Feb. 22, 2000

(30) Foreign Application Priority Data

Feb. 22, 1999 (FR) ........................ FR99/02187

(51) Int. Cl.[7] .............. B60J 1/00; B06B 3/58; B60R 21/00
(52) U.S. Cl. .............. 296/146.2; 296/201; 49/141; 49/502
(58) Field of Search .............. 49/141, 166, 502; 296/146.5, 146.15, 146.2, 146.16, 201

(56) References Cited

U.S. PATENT DOCUMENTS

| | | | | |
|---|---|---|---|---|
| 2,255,725 A | * | 9/1941 | Trescher | 49/141 |
| 2,641,031 A | * | 6/1953 | Ehret | 52/208 |
| 2,818,613 A | * | 1/1958 | Peras | 296/96.22 |
| 3,442,048 A | * | 5/1969 | Elias | 49/141 |
| 3,669,022 A | * | 6/1972 | Dahn et al. | 102/206 |
| 3,729,154 A | * | 4/1973 | Deplante | 244/122 AF |
| 3,737,193 A | * | 6/1973 | Cain | 296/96.22 |
| 3,741,583 A | * | 6/1973 | Usui et al. | 280/735 |
| 3,807,791 A | * | 4/1974 | Boyer | 296/96.14 |
| 4,220,298 A | * | 9/1980 | Willis | 244/129.5 |
| 4,283,885 A | * | 8/1981 | Remick et al. | 49/466 |
| 4,333,381 A | * | 6/1982 | Boeglin et al. | 89/1.14 |
| 4,908,989 A | * | 3/1990 | Omura et al. | 49/441 |
| 5,086,589 A | * | 2/1992 | Dibenedetto | 49/502 |
| 5,318,145 A | * | 6/1994 | Vollmer | 180/274 |
| 5,735,081 A | * | 4/1998 | Yamanaka et al. | 49/506 |
| 5,746,026 A | * | 5/1998 | Brede et al. | 49/506 |
| 5,823,608 A | * | 10/1998 | Tanaka et al. | 296/146.2 |
| 5,907,897 A | * | 6/1999 | Hisano | 29/434 |
| 5,979,932 A | * | 11/1999 | Jourdaine et al. | 280/730.2 |
| 6,164,715 A | * | 12/2000 | Mosaner | 296/146.1 |

FOREIGN PATENT DOCUMENTS

| | | | |
|---|---|---|---|
| DE | 1017925 | * 10/1957 | 49/141 |
| DE | 21 15 792 | 10/1972 | |
| DE | 196 11 578 | 9/1997 | |
| DE | 196 32 610 | 2/1998 | |
| EP | 0 597 624 | 5/1994 | |
| FR | 1390412 | * 1/1964 | 49/141 |
| FR | 2 283 294 | 3/1976 | |
| FR | 2 649 654 | 1/1991 | |
| GB | 623957 | * 5/1949 | 49/141 |
| GB | 2 288 625 | 10/1995 | |
| JP | 6346921 | * 2/1988 | 49/502 |
| WO | WO 91/17907 | 11/1991 | |

* cited by examiner

Primary Examiner—Gregory J. Strimbu
(74) Attorney, Agent, or Firm—Oblon, Spivak, McClelland, Maier & Neustadt, P.C.

(57) ABSTRACT

An attachment device for attaching a window in a motor vehicle, the window having at least one sheet of a transparent material and being able, in one position, to close off an opening made in the bodywork of the vehicle and, in one or more other positions, at least partially open the opening. In the closing-off position, the window is fastened to the bodywork of the vehicle but, after an accident, the window-bodywork fastening is explosively weakened.

5 Claims, 2 Drawing Sheets

ATTACHMENT DEVICES FOR ATTACHING A WINDOW FOR A MOTOR VEHICLE

BACKGROUND OF THE INVENTION

1. Field of the Invention

The invention relates to attachment devices for attaching a window for a motor vehicle, consisting of at least one sheet of a transparent material which can, in a first position, close off an opening made in the bodywork of vehicles and, in one or more other positions at least partially open the opening. The sheet made of transparent material is, for example, a sheet of glass or a sheet of plastic.

More specifically, although the invention is not restricted to such applications, it applies to side windows associated with "lift-lower" systems which provide a sliding movement of the windows in the doors of motor vehicles.

2. Description of the Related Art

Customarily, such side windows consist of a sheet of so-called "safety" glass, that is to say glass which meets EC regulation No. 43. In the event of an accident and breakage of the windows, such windows yield small pieces which must not be able to cause the passengers of the vehicle serious injury.

By contrast, such windows have weaknesses as regards the actual security of the vehicle. This is because it is possible to break such windows and gain access to the inside of the vehicle, either to steal the vehicle or to make off with objects or accessories from the cabin.

Anti-theft systems, either in the form of an acoustic alarm or which are able to immobilize the vehicle, have been developed for many years. Although such systems may make it possible to prevent the vehicle from being stolen, they are very often ineffective against simple break-ins by breaking windows in order to steal objects left in the cabin.

In order to respond to and prevent this type of break-in, it has already been proposed that use laminated windows consisting, for example, of two sheets of glass separated by a plastic interlayer. The use of such laminated windows is considered by motor vehicle manufacturers to be a satisfactory response to the problem of preventing theft of, or from, the vehicle. The presence of the sheet of plastic makes breaking the window far more difficult, and this deters, or at the very least discourages, would-be thieves. Furthermore, in the event of an accident, if a sheet of glass breaks, it remains attached to the laminated whole which makes up the window, because of the presence of a sheet of plastic, this result of course minimizing the risk of injury to the passengers because no pieces of glass become detached from the window.

By contrast, the fact that the window maintains its structure if broken is a drawback in the event of an accident. This is because if it is no longer possible, in the event of an accident, to open the side windows on account of mechanical deformation of the doors or an electrical problem, the passengers may find themselves trapped in the cabin of the vehicle. In effect, due to the desire to use such a window to make the vehicle theft-proof, when the window is closed, the door frame is designed to hold the window firmly in place so that intervention from the outside cannot detach the window from the door. It then follows that somebody, who might be injured and therefore slightly incapacitated, located inside the cabin of the vehicle, will not be able to separate the window from the door. If a specialist rescue team is available to intervene, it will be equipped to quickly free these people. However, if it is not, the aforementioned function of the window, which prevents individuals from entering the vehicle by breaking in, leads to the risk of the passengers becoming trapped in the vehicle after an accident.

Solutions for destroying the connection between a laminated window and a bodywork have already been proposed. For example, patent application DE-19 61 15 78 describes a pyrotechnic device which, in the event of an accident, is able to break the window-bodywork connection. This solution in fact consists in destroying the bead of adhesive which connects the window to the bodywork. A solution of this kind therefore requires the window to be attached by adhesive bonding and therefore entails a fixed mounting. It cannot apply to opening windows, particularly sliding windows.

SUMMARY OF THE INVENTION

The inventors therefore set out to develop an attachment device for opening-windows of motor vehicles which, in the event of an accident, allows the windows to open the opening which ordinarily they are supposed to protect against break-in. These windows may be made of a transparent material, such as glass or plastic, or a combination of several transparent materials.

This objective is achieved according to the invention using an attachment device for attaching a window for a motor vehicle, consisting of at least one sheet of a transparent material which can, in one position, close off an opening made in the bodywork of the vehicle and, in one or more other positions, at least partially open the opening, it being possible for the window to be normally fastened to the bodywork of the vehicle in the closing-off position, and this window-bodywork fastening being weakened after an accident.

According to the invention, under normal operating conditions, the window may be fastened to the bodywork and therefore securely attached thereto, so that it is very difficult, if not impossible, to remove the window from the bodywork to create an opening using conventional tools or means, such an attachment thus contributing to the antitheft performance of the vehicle. After an accident, the connection between the window and the bodywork is weakened so that a passenger, even one slightly incapacitated as a result of the accident, can, for example, by pushing with his feet, at least partially separate the window from the bodywork and thus open the opening made in the bodywork, which the window closes off, and thus allow the passengers to get out.

According to a first embodiment of the attachment device according to the invention, fastening is achieved over at least part of the periphery of the window. In particular, in the case of a sliding side window, apart from the lower part of the window which is housed inside the door so that it can be attached to the "lift-lower" system, the invention advantageously envisages secure attachment or fastening at the opposite part, that is to say near the top of the window. Depending on the dimensions and shape of the window and the nature of the recess, the invention envisages fastening over a larger area which may be as much as the entire periphery of the window.

According to other embodiments of the attachment device according to the invention, fastening is achieved at least partially via complementary elements surface-mounted on the window. These complementary elements are, for example, profiled rods or pegs fixed to the window at one end, the other end being associated, in the case of a sliding window, with a slideway secured to the bodywork, so that it additionally eases and guides the sliding of the window. These may also be profiled elements extending over the height of the window. In the same way, such profiled elements may be both attached to the window and associated with a slideway. There are advantageously two of such elements provided, these being positioned on the lateral areas of the window so that they are hidden by the lateral uprights of the door. These elements may be attached to the window for example by passing them through a hole made initially in the window, in the case of pegs, or by adhesive bonding, or alternatively by any other attachment means known to those skilled in the art.

As regards the weakening of the fastening which, according to the invention, is to exist after an accident, this may, according to the invention, be achieved in different ways in the case of fastening achieved by complementary elements on the surface of the window. First of all, the fastening may be weakened by breaking these complementary elements and therefore eliminating the main connection between window and bodywork. These elements may be broken manually, preferably only from inside the vehicle, by the occupants of the vehicle; for that, the complementary elements may be provided with an area of weakness which limits the force needed to break them but which remains insensitive to the forces generated by the intended movements of the window, for example sliding in the case of an opening side window of a door. According to other envisaged embodiments of an invention, the complementary elements may be broken automatically in the event of an accident. Such breakage may be achieved using sensors, for example those already provided for setting off the airbags, and an explosive substance associated with an area of weakness provided on the elements and capable of breaking these when it explodes; such substances may also be chosen from those already used, for example, for airbags.

The fastening may alternatively be weakened by acting either on the connection between the window and the complementary elements or on the connection between the complementary elements and the bodywork. In the former case, and particularly when these complementary elements are adhesively bonded to the glass, the invention envisages, for example, combining an explosive substance into the adhesive primer, which can, according to the principle mentioned hereinabove, break the connection in a similar way to the setting off of airbags. In the latter case, it is possible, for example, according to the invention, still using an explosive substance, to destroy or detach from the bodywork the slideways to which the complementary elements are connected. In this way, a window is no longer connected to the bodywork by these complementary elements, and is thus fastened less securely to the bodywork.

When the window is fastened over at least part of its periphery, the invention envisages various alternative ways of weakening the fastening. First of all, it is possible to provide a frame forming the opening that is closed off by the window, and more particularly the recess, for example, in which the window slides, made up of several detachable elements, the detachment of which weakens the fastening. According to a preferred embodiment, the frame elements forming that part of the recess that is exterior to the vehicle may be detached from the bodywork. The detachment of these elements is advantageously achieved by the presence of an explosive substance which acts as mentioned hereinabove according to the known techniques for setting off airbags. The substance advantageously acts on the attachment elements such as rivets which join the various parts together. These attachment elements may be manufactured specially and contain the explosive substance.

According to another alternative form regarding the weakening of the fastening achieved over at least part of the periphery, the invention envisages, particularly at the upper part of the recess in the case of a sliding window, a recess that is deep enough to allow the window to adopt two positions, the window maintaining its closing-off function in the two positions. In a first position, with the window placed in the bottom of the recess, the window is perfectly fastened to the bodywork. In the second position, the window is either at the limit of the recess or still engaged in the recess; in the first instance, the window still closes off the opening but is no longer housed in the recess, and as far as the upper part of the window is concerned, its fastening is weakened. In the second instance, the invention envisages that at least that part of the recess-forming frame on the outside of the vehicle which is in contact with the window be made of a deformable material. Thus, pressure exerted on the window from inside the vehicle allows this window to be released from the bodywork and an opening created.

According to a first alternative form of the invention, the fastening of the window into the bodywork is weakened at least at the time of the accident. According to this alternative form of the invention, the fastening of the window into the bodywork is weakened at the time of the accident at the latest; according to a first embodiment, weakening occurs before the accident and preferably as soon as the vehicle is no longer immobilized or as soon as the engine is started. An embodiment of this kind is entirely suitable for an attachment device which envisages a recess, at least towards the top, with two positions for the window and a deformable material constituting that part of the recess which is in contact with the glass on the outside of the vehicle. The window can easily be moved from one position to the other inside the recess by the motors of the "lift-lower" system which are in working order. In the case of an embodiment in which weakening occurs at the time of the accident, the use of the motors is not without risk, as these could be damaged during the accident and rendered unserviceable before they have fulfilled their function. An embodiment of this kind is more suited to the various embodiments mentioned earlier, in which use is made of an explosive substance to weaken the fastening, this substance being used in a similar way to the systems for setting off airbags. This, for example, involves breaking the connection between window and bodywork by means of complementary elements attached to the surface of the window, or alternatively detaching the various parts that form the recess. The use of an explosive substance set off at the time of the accident may also be used in the case of a sliding window, to cause the window to drop slightly before excessive bodywork deformation can occur. An explosive substance of this kind may, for example, set off the inflation of an airbag placed in the recess towards the top of the window and cause the window to drop slightly so that it no longer housed in the top part of the recess and thus weaken its fastening. According to another example, the explosion may break the window "lift-lower" mechanism and more specifically retract it, leading to a swift downwards movement of the window and therefore a result similar to the previous one.

According to a second alternative form of the invention, the attachment of the window to the bodywork is weakened after the accident. Such an alternative form has an additional advantage, for example in the case of laminated windows which, even when broken, retain their structure; this advantage is that since the opening remains closed off, it prevents the passengers from being thrown out, for example if the vehicle barrel-rolls. This alternative embodiment of the invention is still suited to all the aforementioned embodiments for weakening the fastening, involving an explosive substance.

By contrast, an adaptation needs to be made by comparison with the previous embodiment, in order to delay the explosion. This can be achieved simply by fitting an electric retarder between the sensors which detect the accident and the explosion initiators.

Another preferred embodiment consists in fitting immobilizer sensors; triggering is then carried out in two stages: detection of an accident then detection that the vehicle is immobilized. The anti-ejection function is then entirely effective.

This second alternative form is also suited to all the embodiments of weakening the fastening using a manual operation. A passenger may actuate a command intended, for example, to break the complementary elements attached to the surface of the window or to break the connection between the various parts of a frame forming the recess. Advantageously, the command does not become operational until after an accident has been detected. This may alternatively involve a command which sets off an explosive substance in accordance with all the embodiments described hereinabove.

The invention thus described, which allows the fastening of a window to be weakened so that this window can be released from the bodywork, particularly after an accident, although not being limited to such applications, is more particularly suited to windows which are supposed to remain intact in the event of an accident, to guarantee safety and more particularly to get the passengers out.

Such windows are, for example, windows consisting of at least one sheet of plastic of the following type: PVB (polyvinylbutyral), PC (polycarbonate), PMMA (polymethyl methacrylate), COC (cycloolefin copolymer), or alternatively an ionomer resin such as a methacrylic acid and polyethylene copolymer, or alternatively a copolymer of acrylic acid and ethylene neutralized with a polyamine or alternatively a polyurethane, a thermoplastic polyurethane, a polyethylene terephthalate, a polyester or an acrylic or modified acrylic resin. The thickness of such a sheet of plastic may be between 0.3 mm and 5 mm.

According to a preferred embodiment of the invention, the window includes at least two sheets of glass separated by at least one plastic interlayer. The sheets preferably have a thickness of between 0.3 mm and 3 mm, which corresponds to total glass thicknesses of between 1 mm and 6 mm for a window.

BRIEF DESCRIPTION OF THE DRAWINGS

Other details and advantageous features of the invention will emerge hereinafter from the description of some embodiments given with reference to FIGS. 1, 2, 3, 4 and 5, which depict.

DETAILED DESCRIPTION OF THE PREFERRED EMBODIMENTS

Figure 1:
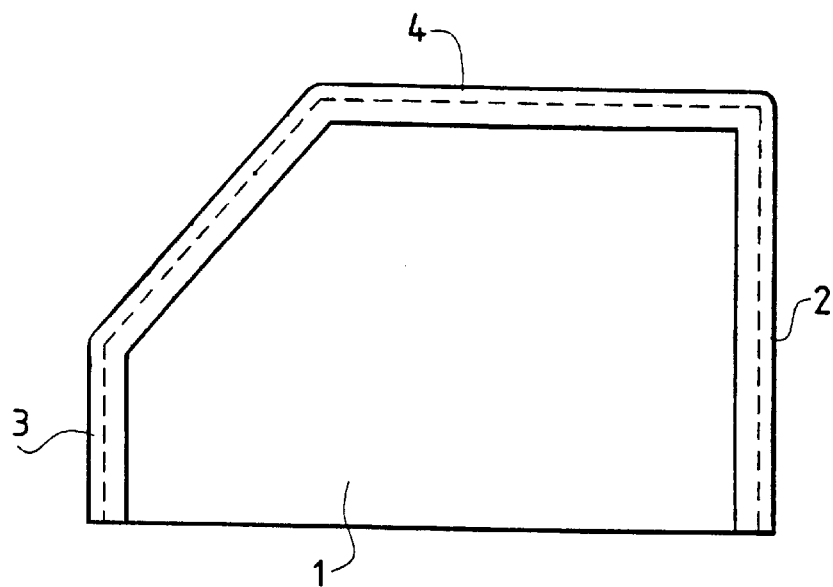
FIG. 1: a diagrammatic front view of a window fixed into the window frame of a vehicle, according to a first embodiment.

FIG. 1 depicts, viewed form outside a vehicle, a sliding window 1 engaged in the recess 5 of a frame having the lateral parts 2, 3, the top part 4 and a lower part, not depicted, of a motor vehicle door. In this position, the window closes off the opening or window hole made in the door. The "lift-lower" mechanism fixed in the bottom of the door is also not depicted.

Figure 2:
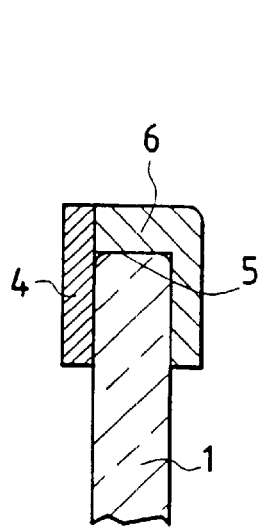
FIG. 2: a diagrammatic side elevation of FIG. 1, FIG. 3: a diagrammatic side elevation of FIG. 1, according to a second embodiment.

FIG. 2 shows more clearly the way in which the window 1 is housed in the recess 5 in order to fasten the window 1 to the bodywork of the vehicle. The recess 5 at the top of the window consists of a part 4 visible from outside the vehicle and of a part 6 which may close the door frame. The part 4 is attached to the part 6 by rivets, not depicted, or any other means of attachment known to those skilled in the art. The invention envisages breaking these rivets in the event of an accident, either at the time of the accident or later, so as to weaken the window fastening. These rivets may be broken either by an explosive substance which acts instantly in the event of an accident or with a time delay. The explosive substance is either connected to one of the parts 4 or 6 or built into the body of the rivet. The rivets may alternatively be broken by mechanical means provided in the body of the door and actuated for example by a passenger via a command.

Figure 3:
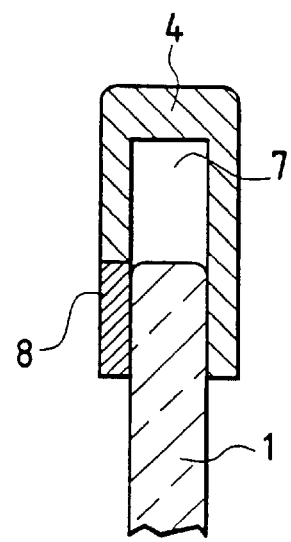

FIG. 3 illustrates a recess 7 which is deeper than in the previous embodiment, formed integrally by the part 4 visible from the outside and extended, at least on the outside of the vehicle, by a strip 8 made of a deformable or supple material. According to this embodiment, the window 1 can occupy at least two positions while remaining in the recess 7, and thus fulfilling its closing-off function. In the first position, the window 1 is in the bottom of the recess, in contact with the rigid part 4. This position fastens the window 1 to the bodywork. In the second position, depicted in FIG. 3, the window 1 is at the mouth of the recess 7, and on the outside of the vehicle is in contact with the strip 8. At its top, the window is therefore no longer firmly held in the bodywork. Tests have shown that pressure exerted on the window by a passenger, for example using his feet, may be enough to almost completely detach the window from the bodywork and, in any event, create a way out for the passengers after an accident. The movement from one position to the other may take place automatically as soon as the vehicle engine is started. Thus, as long as the vehicle is immobilized, the window 1 plays a part in avoiding the risk of entry to the vehicle by a break-in.

Figure 4:
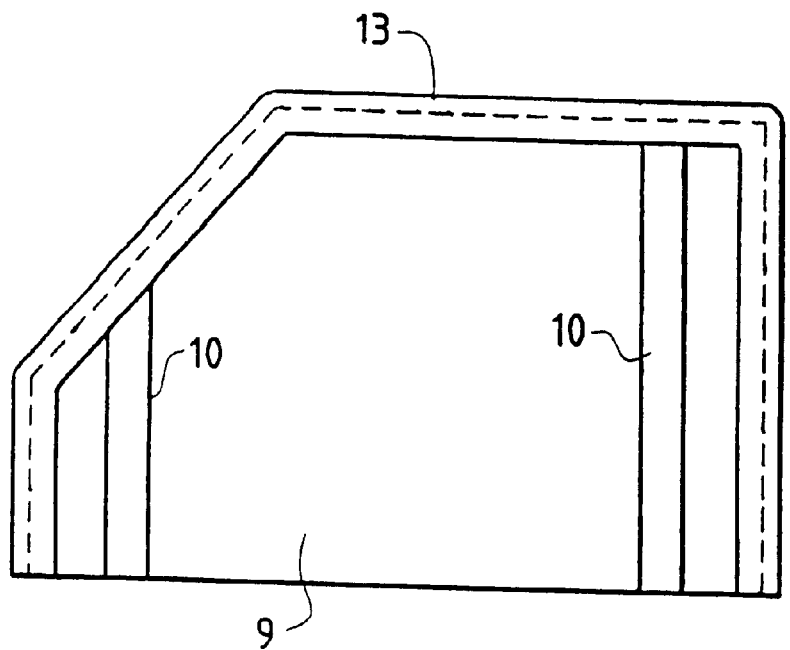
FIG. 4: a diagrammatic front view of a window fixed into the window frame of a vehicle, according to a third embodiment.
Figure 5:
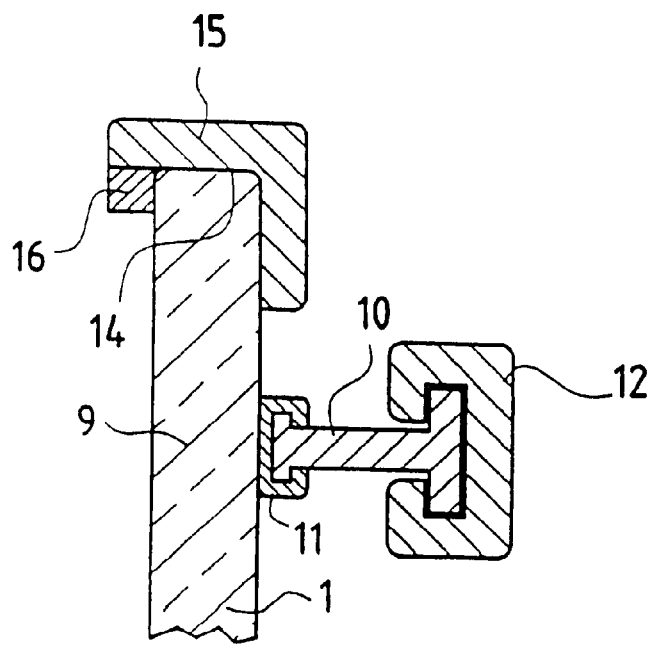
FIG. 5: a diagrammatic side elevation of FIG. 4.

FIGS. 4 and 5 illustrate a last embodiment of the device according to the invention. A window 9 is equipped with two profiled metal elements 10 attached to the surface of the window and extending over its entire height. These elements 10 are attached to the surface of the window by a profiled bead of plastic adhesive 11, for example made by extrusion or encapsulation. They are also attached to a slideway 12, secured to the bodywork. The elements 10 thus guide and smooth the movement of the window 9, and play a part in fastening the window 9 to the bodywork, by forming two areas of attachment. The door frame 13 forming the recess 14 in which the window 9 is inserted in the closing-off position is made in two non-detachable parts 15, 16. The part 16, which is visible from outside the vehicle, is made of a supple or deformable material. This part 16 may, in certain configurations, be restricted to that part of the frame which corresponds to the upper part of the window 9. In the event of an accident, the elements 10 are, for example, detached from the window immediately or later. This detachment is advantageously achieved by the explosion of an explosive substance, like the one described previously, placed in the plastic 11, which detaches the elements 10 from the window 9. The window 9, thus released by these two areas of attachment by the elements 10, can be at least partially removed from the recess 14 and form a way out.

The various embodiments of the invention presented make it possible to produce a window attachment device which guarantees fastening to the bodywork when the window is in a position of closing off an opening made in the bodywork, an weakening of the fastening in the event of an accident. This weakening allows a passenger, even one weakened by the accident, to be able to open the opening made in the bodywork, so as to create a passage and get out of the vehicle.

Various tests have shown that the force that can be exerted by the legs pressing against the window is high enough in all the embodiments mentioned.

Furthermore, according to certain embodiments of the device according to the invention, it is possible to guarantee protection against the risks there might be in certain types of accident of people being thrown out of the vehicle, in addition to providing the sought-after properties of protecting the vehicle from break-in and allowing passengers to get out in the event of an accident.

What is claimed is:

1. In a motor vehicle having a body and a window opening formed by a frame of the body, and a sheet of transparent material movably mounted to the vehicle for movement between a closed position in which the sheet of transparent material closes the opening and at least one other position in which the sheet of transparent material at least partly opens the opening, a system comprising:

means for attaching the sheet of transparent material to the body such that the sheet of transparent material is securely held in the vehicle body; and means, responsive to the occurrence of a collision, for weakening the secure hold of the sheet of transparent material in the vehicle body.

2. In a motor vehicle having a body and a window opening formed by a frame of the body, and a sheet of transparent material movably mounted to the vehicle for movement to a closed position in which the sheet of transparent material closes the opening and to at least one other position in which the sheet of transparent material at least partly opens the opening, a system for attaching the sheet of transparent material to the vehicle body, comprising:

a recess formed by the frame, which recess securely holds the sheet of transparent material in the closed position; and means, responsive to the occurrence of a collision, for weakening the frame such that the sheet of transparent material may be removed from the frame by a force from inside the vehicle.

3. In a motor vehicle having a body and a window opening formed by a frame of the body, and a sheet of transparent material movably mounted to the vehicle for movement to a closed position in which the sheet of transparent material closes the opening and to at least one other position in which the sheet of transparent material at least partly opens the opening, a system for attaching the sheet of transparent material to the vehicle body, comprising:

a recess formed by the frame, which recess securely holds the sheet of transparent material in the closed position; and an explosive part in the frame, which is operative in response to the occurrence of a collision, to weaken the secure hold of the sheet of transparent material.

4. The vehicle of one of claims 1, 2 or 3, wherein the sheet of transparent material includes at least one layer of plastic selected from the group consisting of (PVB) polyvinylbutyral, (PC) polycarbonate, (PMMA) polymethyl methacrylate, (COC) cycloolefin copolymer, an ionomer resin, a copolymer of acrylic acid and ethylene neutralized with a polyamine, a polyurethane, a thermoplastic polyurethane, a polyethylene terephthalate, a polyester, an acrylic resin, and a modified acrylic resin.

5. The vehicle of one of claims 1, 2 or 3, wherein the sheet of transparent material comprises at least two sheets of glass separated by at least one plastic interlayer.

* * * * *

UNITED STATES PATENT AND TRADEMARK OFFICE
CERTIFICATE OF CORRECTION

| | |
|---|---|
| PATENT NO. | : 6,364,397 B1 |
| APPLICATION NO. | : 09/507944 |
| DATED | : April 2, 2002 |
| INVENTOR(S) | : Bordeaux et al. |

Page 1 of 1

It is certified that error appears in the above-identified patent and that said Letters Patent is hereby corrected as shown below:

On the title page, Item (54), and at top of Column 1, the title should read:

-- (54) ATTACHMENT DEVICES FOR ATTACHING A WINDOW FOR A MOTOR VEHICLE WHICH ARE WEAKENED AFTER AN ACCIDENT --

Signed and Sealed this

Nineteenth Day of February, 2008

JON W. DUDAS
*Director of the United States Patent and Trademark Office*